April 28, 1964  J. V. COWAN  3,130,577
ULTRASONIC INSPECTION APPARATUS
Filed Jan. 26, 1961  2 Sheets-Sheet 1

INVENTOR
JOHN V. COWAN
BY
ROBERT HOCKFIELD
ATTORNEY.

April 28, 1964     J. V. COWAN     3,130,577
ULTRASONIC INSPECTION APPARATUS
Filed Jan. 26, 1961     2 Sheets-Sheet 2
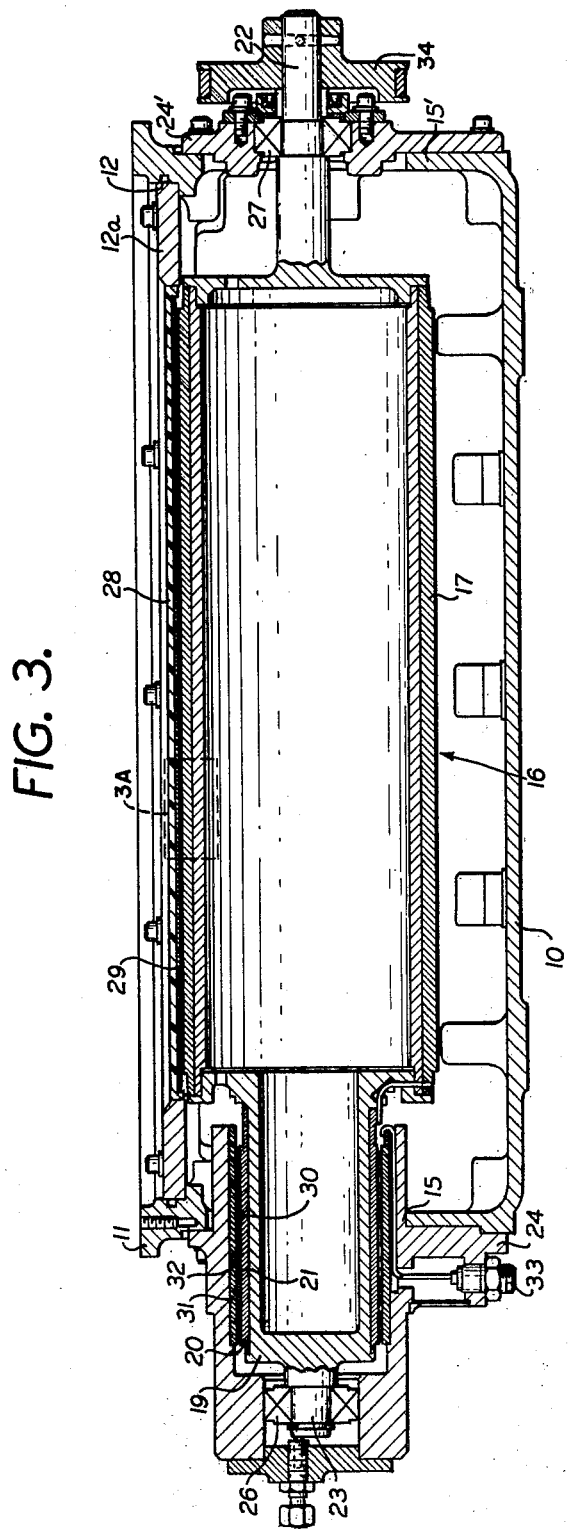
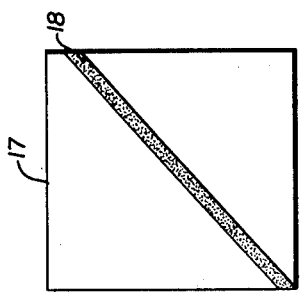
INVENTOR
JOHN V. COWAN
BY
ROBERT HOCKFIELD
ATTORNEY.

United States Patent Office 3,130,577
Patented Apr. 28, 1964

3,130,577
ULTRASONIC INSPECTION APPARATUS
John V. Cowan, Danbury, Conn., assignor, by mesne assignments, to Automation Industries, Inc., El Segundo, Calif., a corporation of California
Filed Jan. 26, 1961, Ser. No. 85,102
4 Claims. (Cl. 73—67.5)

This invention relates to ultrasonic inspection apparatus and, more particularly, pertains to a new and improved electromechanical transducer system for scanning an object under inspection.

In ultrasonic inspection, a transducer is acoustically coupled to an object under test and is energized with pulses of ultrasonic energy so that wave energy is propagated into the object. Reflections from discontinuities or defects cause pulses of ultrasonic wave energy to return to the transducer and these are converted to electrical pulse signals which are supplied to an appropriate indicator where the timing of the returning pulses with respect to the emitted pulses indicates the distance to the discontinuities or defects. In order to explore the entirety of an object under test, the transducer and the object are moved relative to one another. However, the size and/or configuration of the test object may make such exploration of the test object difficult or too slow.

It is, therefore, an object of the present invention to provide a new and improved object-scanning system for ultrasonic inspection apparatus.

Another object of the present invention is to provide a new and improved object-scanning system for ultrasonic inspection apparatus featuring high speed scanning of an object under test.

An object-scanning system for ultrasonic inspection apparatus in accordance with the present invention comprises a transducer element having a wave-emitting surface and having another surface and means for completing an electrical connection to a portion of the emitting surface of the transducer element. An electrical conductor is supported for movement relative to the other surface of the transducer element and is capacitively coupled thereto, and means are provided for displacing the electrical conductor.

The novel features of the present invention are set forth in more particularity in the appended claims. The present invention, both as to its organization and manner of operation, together with further objects and advantages thereof, may best be understood by a reference to the following description taken in connection with the accompanying drawings in which:

FIG. 2 represents a developmental view of one of the components shown in FIG. 1;

FIG. 3 is a view in longitudinal cross-section of the system illustrated in FIG. 1 but shown in assembled condition; and FIG. 3A is an enlarged representation of the portion of FIG. 3 enclosed by broken line rectangle 3A.

Figure 1:
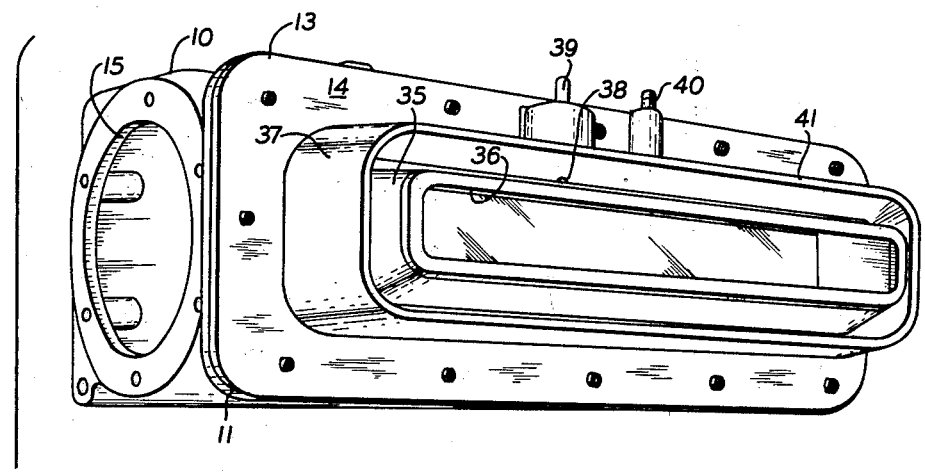
FIG. 1 illustrates in perspective views certain components of an object-scanning system in accordance with the present invention prior to assembly.
Figure 1:
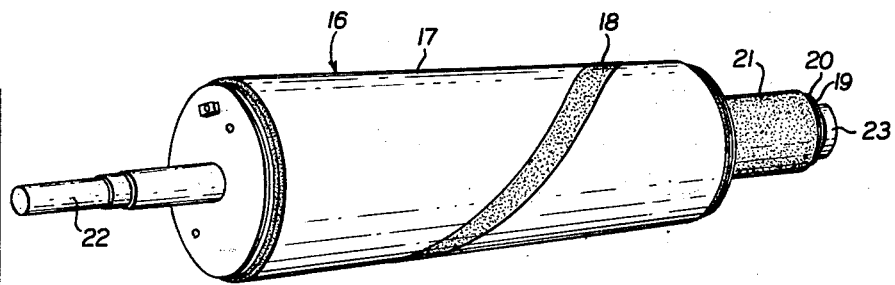
Figure 1:
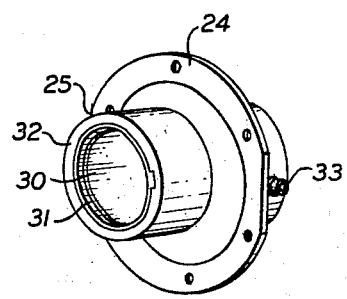

As illustrated in FIG. 1 of the drawings, an object-scanning system for ultrasonic inspection apparatus in accordance with the present invention includes an elongated, hollow housing 10 having a laterally extending, elongated flange 11 on which a conforming flange 13 of a coupling member 14 is seated and secured thereto. The structure and function of member 14 will be described hereinafter. One end of housing 10 has an opening 15 which is aligned with another opening 15' (FIG. 3) in the opposite end. The housing is adapted to receive a cylinder 16 that carries an electrical insulating material 17 such as polyurethane on which an electrical conductor 18 is supported. Conductor 18 may be constructed of a thin layer of silver and, as shown in FIG. 2, is disposed at an angle relative to the developmental rectangle of cylinder 17. Thus, in cylindrical configuration, conductor 18 is in the form of a one turn spiral around cylinder 17.

A portion 19 of reduced diameter extends from one end of cylinder 16 and carries an electrically insulating layer 20, such as polyurethane, on which a cylindrical conductor 21 constructed, for example, of silver, is supported. End shafts 22 and 23 extend in opposite directions from the cylinder 16.

An end closure 24 is provided for opening 15 and includes a section 25 which cooperates with cylinder portion 19. Another closure 24' (FIG. 3) is provided for opening 15'.

As shown in FIG. 3, flange 11 has a large upper opening 12 through which the cylinder 16 may be introduced into housing 10. Shafts 22 and 23 extend through openings 15' and 15, respectively, and end closures 24 and 24'' carry bearings 26 and 27 for the shafts 23 and 22 so that cylinder 16 is rotatable within the housing 10.

Opening 12 is closed by a frame 12a for a window 28 of a material essentially transparent to ultrasonic wave energy such as polyurethane, supported adjacent to the surface of cylinder 16. Secured to the underside of the window 28 is a piezo-electric transducer 29 constructed, for example, of lead zirconate. The upper surface of transducer 29 is coated with a thin layer of silver 29' so that an electrical connection can be made thereto.

The upper surface of transducer element 29 may be termed an ultrasonic-wave-emitting surface and the opposite surface is closely spaced to the surface of cylindrical insulator 17 that carries conductor 18. Thus, a capacitive coupling is formed between the opposite surface of the transducer element and conductor 18. The conductor 18 is electrically connected by means (not shown) to the conductive layer 21 which is, in turn, capacitively coupled to a conductive layer 30 (shown in FIG. 1) constructed, for example, of silver, on the internal surface of a cylindrical sleeve 31 of electrically insulating material supported within opening 32 in end closure 24.

Appropriate seals are provided so that the housing is substantially fluid-tight and by means of a valve 33 appropriate high dielectric, electrically insulating liquid, such as ethylene glycol is introduced. A driving pulley 34 is coupled to the outer end of shaft 22 so that the cylinder 16 may be rotated by coupling a driving motor (not shown) to the pulley.

Referring again to FIG. 1, member 14 includes a raised central portion 35 forming an elongated mouth 36 that is aligned with window 28 (FIG. 3). Another raised portion 37 of member 14 encircles mouth 36 and the annulus between portions 35 and 37 forms a closed channel provided with a small opening 38 connected to a tube 39. Mouth 36 extends through member 14 and a tube 40 is connected thereto. An ultrasonic-wave-energy couplant, such as water, is fed into tube 40 and thus mouth 36 is filled with this liquid. Overflow falls into the annulus defined by portions 35 and 37 and is discharged through opening 38 and tube 39. A perforated closure 41 constructed of a substantially wave-energy-transparent material, such as polyurethane, may be provided for mouth 41 to smooth the flow of couplant liquid and to provide a cushion for the object under inspection. If desired a member of rubber (not shown) may be fixed to the upper periphery of portion 37.

In operation with the liquid couplant flowing into tube 40 an object to be tested is placed in contact with member 41, and the couplant liquid extends between the window 28 and the surface of the test object thereby completing an ultrasonic-wave transmission path between the transducer element 29 and the test object. By means of an electrical connection to the conductive coating on the upper surface of transducer element 29 and a connection to conductive layer 30, the transducer element is electrically connected to conventional apparatus (not shown) of the type illustrated, for example, in United States Patent No. 2,398,701, for energizing the transducer with ultrasonic energy so that wave energy is propagated into the test object. Reflections from discontinuities or defects cause pulses of ultrasonic wave energy to return to the transducer and these are converted by the transducer to electrical pulse signals which are supplied to the indicator portion of the ultrasonic inspection apparatus where the timing of the returning pulses with respect to the emitted pulses indicates the distance to the discontinuities or defects in a known manner.

By rotating pulley 34, cylinder 16 is rotated thus causing the conductive spiral 18 to move relative to the transducer element 29. Accordingly, only that portion of the transducer element 29 which is electrically coupled to the immediately adjacent portion of spiral 18 is excited. As the cylinder 16 rotates, it is obvious that the spiral 18 effectively moves along the length of the transducer element 29 and scanning of the test object is effected. One scan occurs for each revolution of the cylinder 16, and after a scan is completed the test object is displaced transversely to the direction of mouth 36 so that the entirety of the test object can be inspected.

It is to be understood that where reference is made to a transducer in its function of the conversion of electrical energy to wave energy, the theorem of reciprocity applies, and the transducer exhibits the same or similar characteristics in its function of converting wave energy to electrical energy.

While a particular embodiment of the present invention has been shown and described, it is apparent that changes and modifications may be made without departing from this invention in its broader aspects, and, therefore, the aim in the appended claims is to cover all such changes and modifications as fall within the true spirit and scope of this invention.

What is claimed is:

1. An object-scanning system for ultrasonic inspection apparatus comprising: a transducer element having a wave-emitting surface and having another surface substantially parallel to said wave-emitting surface; means for completing an electrical connection to a portion of said emitting surface of said transducer element; an electrical conductor supported for movement relative to said transducer element, that portion of said conductor nearest the transducer element defining a path parallel thereto and positioned to be capacitively coupled thereto; and means for displacing said electrical conductor along said path thereby to provide capacity coupling between said electrical conductor and said other surface through a range of successive portions of said other surface.

2. An object-scanning system in accordance with claim 1 further comprising a cylindrical member having an exterior surface of electrical insulation material and wherein said electrical conductor is disposed in a spiral about said insulation material, and wherein said means for displacing said electrical conductor includes means for rotating said cylindrical member.

3. An object-scanning system in accordance with claim 1 wherein said transducer element is of elongated configuration and further comprising an elongated housing having an elongated wave energy window portion of a configuration similar to that of said transducer element and wherein said transducer element is supported within said housing with said wave-emitting surface facing and essentially co-extensive with said window portion.

4. An object-scanning system in accordance with claim 3 wherein said housing is adapted to contain a liquid and further comprising an electrically insulating, high dielectric liquid disposed within said housing.

References Cited in the file of this patent

UNITED STATES PATENTS

| | | |
|---|---|---|
| 2,240,449 | Wolfskill | Apr. 29, 1941 |
| 2,409,876 | Martin et al. | Oct. 22, 1946 |
| 2,800,789 | Henry | July 30, 1957 |
| 2,862,384 | Renaut | Dec. 2, 1958 |